US011118077B2

(12) United States Patent
Yoo et al.

(10) Patent No.: US 11,118,077 B2
(45) Date of Patent: Sep. 14, 2021

(54) ULTRAVIOLET CURABLE AND INFRARED PERMEABLE INK COMPOSITION FOR INKJET, HAVING ENHANCED HIGH TEMPERATURE RESISTANCE

(71) Applicant: LG CHEM, LTD., Seoul (KR)

(72) Inventors: Jae-Hyun Yoo, Daejeon (KR); Joon-Hyung Kim, Daejeon (KR); Yong-Sung Goo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/744,743

(22) PCT Filed: Sep. 12, 2016

(86) PCT No.: PCT/KR2016/010283
§ 371 (c)(1),
(2) Date: Jan. 12, 2018

(87) PCT Pub. No.: WO2017/052131
PCT Pub. Date: Mar. 30, 2017

(65) Prior Publication Data
US 2018/0223118 A1 Aug. 9, 2018

(30) Foreign Application Priority Data

Jul. 5, 2016 (KR) .................. 10-2016-0085008

(51) Int. Cl.
| | |
|---|---|
| *C09D 11/322* | (2014.01) |
| *B41M 3/00* | (2006.01) |
| *B41M 5/00* | (2006.01) |
| *B41M 7/00* | (2006.01) |
| *C09D 11/101* | (2014.01) |
| *C09D 11/102* | (2014.01) |
| *C09D 11/107* | (2014.01) |

(Continued)

(52) U.S. Cl.
CPC ........... *C09D 11/322* (2013.01); *B41M 3/003* (2013.01); *B41M 5/0023* (2013.01); *B41M 7/0081* (2013.01); *C09D 11/101* (2013.01); *C09D 11/102* (2013.01); *C09D 11/107* (2013.01); *C09D 11/38* (2013.01); *G02B 5/208* (2013.01)

(58) Field of Classification Search
CPC ... C09D 11/322; C09D 11/101; C09D 11/102; C09D 11/107; C09D 11/38; B41M 3/003; B41M 5/0023; B41M 7/0081; G02B 5/208
USPC ...................................... 522/75, 78; 252/586
See application file for complete search history.

(56) References Cited

U.S. PATENT DOCUMENTS

| | | | | |
|---|---|---|---|---|
| 2010/0163811 A1* | 7/2010 | Oh | ........................ | C08K 5/3432 252/586 |
| 2011/0092610 A1* | 4/2011 | Habashi | ................... | B41J 2/155 522/75 |
| 2015/0034886 A1* | 2/2015 | Lee | ........................ | G03F 7/0007 252/586 |

FOREIGN PATENT DOCUMENTS

| | | |
|---|---|---|
| CN | 101573663 | 11/2009 |
| CN | 101770172 | 7/2010 |

(Continued)

*Primary Examiner* — Ling Siu Choi
*Assistant Examiner* — Ronald Grinsted
(74) *Attorney, Agent, or Firm* — Dentons US LLP

(57) ABSTRACT

The present invention relates to an ultraviolet curable and infrared permeable ink composition for an inkjet, having enhanced high temperature resistance, which exhibits constant infrared transmissivity, surface hardness, and the like by preventing the discoloration and the deformation thereof even if a high temperature-heat treatment is performed during curing, drying, and the like.

14 Claims, 2 Drawing Sheets

(51) Int. Cl.
*C09D 11/38* (2014.01)
*G02B 5/20* (2006.01)

(56) References Cited

FOREIGN PATENT DOCUMENTS

| | | | |
|---|---|---|---|
| CN | 103676475 | | 3/2014 |
| JP | 3317033 | | 8/2002 |
| JP | 2014063091 | * | 4/2014 |
| KR | 10-2009-0047620 | | 5/2009 |
| KR | 10-2011-0073372 | | 6/2011 |
| KR | 10-2014-0039982 | | 4/2014 |
| KR | 10-2015-0064107 | | 6/2015 |
| WO | 2008-078953 | | 7/2008 |

* cited by examiner

ULTRAVIOLET CURABLE AND INFRARED PERMEABLE INK COMPOSITION FOR INKJET, HAVING ENHANCED HIGH TEMPERATURE RESISTANCE

TECHNICAL FIELD

This application is a National Stage Application of International Application No. PCT/KR2016/010283 filed on Sep. 12, 2016, which claims priority to and the benefit of Korean Patent Application No. 10-2015-0133084, filed Sep. 21, 2015 and Korean Patent Application No. 10-2016-0085008, filed Jul. 5, 2016, in the Korean Intellectual Property Office, all of which are incorporated herein in their entirety by reference for all purposes as if fully set forth herein.

The present invention relates to an ultraviolet curable and infrared permeable ink composition for an inkjet, having enhanced high temperature resistance. More specifically, it relates to an ultraviolet curable and infrared permeable ink composition for an inkjet, having enhanced high temperature resistance, which exhibits constant infrared transmissivity, surface hardness, and the like by preventing the discoloration and the deformation thereof even if a high temperature-heat treatment is performed during curing, drying, and the like.

BACKGROUND ART

Mobile devices including a smart phone have become necessities for children and adults of all ages living in present day, and originality, convenience and the like of such mobile devices are developing rapidly. However, with such growth, there are many problems to be solved, and many studies for solving the problems are continuing constantly. Among these problems, there is a problem that discoloration, deformation, crack and the like of an infrared ink are happened when embodying a transparent electrode pattern on a display part of a touch window by a high temperature process after forming a bezel, an infrared (Infrared Ray; IR) ink and the like during a manufacturing process of a touch window of a mobile device. This damage on the infrared ink causes transmittance change, and this change makes it difficult for an infrared sensor to normally operate.

Figure 1:
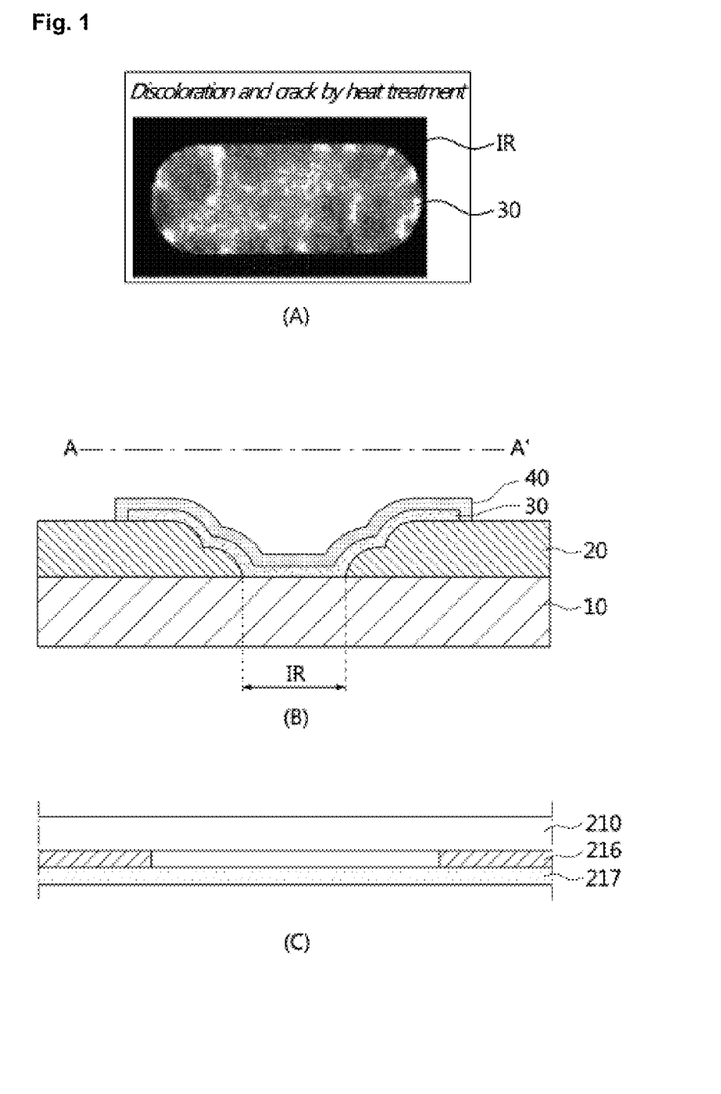
FIG. 1A shows a damaged conventional infrared ink layer and FIGS. 1B and 1C show various forms of substrates used for protecting an infrared sensor.

In order to solve the above problems, various attempts have been made so far. FIG. 1A shows a damaged conventional infrared ink layer and FIGS. 1B and 1C show various forms of substrates used for protecting an infrared sensor. In FIG. 1B, a transparent protective layer is formed on top of the infrared ink layer to protect the infrared ink layer, and in FIG. 1C, the infrared ink layer is formed in the form of a tape and adhered to a surface. Korean Patent Application No. 10-2012-0070482 relates to a touch window and a fabricating method of the same, and a LCD using the same. It discloses that a transparent protective layer 40 for protecting an infrared coating layer (or infrared ink layer, 30) is formed on top of the infrared coating layer 30 as illustrated in FIG. 1B, and a high temperature process for depositing an electrode is performed in order to prevent a damage of the infrared ink layer 30 as illustrated in FIG. 1A (Reference numerals 10 represents a glass and 20 represents a bezel).

Further, Korean Patent Publication No. 10-2013-0063570 relates to a mobile terminal and a method for manufacturing the same. It discloses that an infrared ink layer 217 is formed in the form of a tape followed by adhering thereof to a rear surface of a light permeable window 210 as illustrated in FIG. 1C, in order to prevent discoloration and crack of the infrared ink layer, which can be occurred while depositing the electrode on the rear surface of the window 210. However, this method has a problem that processing time and cost are increased due to added unnecessary processes. Therefore, there is a need for a method to compensate these disadvantages, i.e., a method which can prevent discoloration and deformation of the infrared ink layer and also can minimize processing time and projected cost.

DISCLOSURE

Technical Problem

It is one object of the present invention to provide an ultraviolet curable and infrared permeable ink composition for an inkjet, having enhanced high temperature resistance, which exhibits constant infrared transmissivity, surface hardness, and the like by preventing the discoloration and the deformation thereof even if a high temperature-heat treatment is performed during curing, drying, and the like.

Technical Solution

In order to accomplish the object, the present invention provides an ultraviolet curable and infrared permeable ink composition for an inkjet, having enhanced high temperature resistance, which comprises: an organic black pigment selected from the group consisting of perylene black or lactam black, or a pigment dispersion containing the organic black pigment; an acryl monomer having four or more functional groups; an acryl monomer having three functional groups; an acryl monomer having two functional groups; an acryl monomer having one functional group; and a photoinitiator, and which has transmittance of 80% or higher at infrared wavelength (800 nm or higher), and maintains transmittance change within 1% even after heat treating at a high temperature of 200° C. or higher.

Further, the present invention provides an optical filter formed by using the ultraviolet curable and infrared permeable ink composition for an inkjet, having enhanced high temperature resistance.

Advantageous Effects

The ultraviolet curable and infrared permeable ink composition for an inkjet, having enhanced high temperature resistance, according to the present invention, has an advantage of constant infrared transmissivity, surface hardness and the like of an infrared ink layer because there is no discoloration and deformation even if a high temperature-heat treatment is performed during curing, drying, and the like.

MODE FOR INVENTION

Hereinafter, the present invention will be described in detail.

The ultraviolet curable and infrared permeable ink composition for an inkjet, having enhanced high temperature resistance, according to the present invention, is characterized by comprising: an organic black pigment selected from the group consisting of perylene black or lactam black, or a pigment dispersion containing the organic black pigment; an acryl monomer having four or more functional groups (or a multifunctional acryl monomer); an acryl monomer having three functional groups (or a trifunctional acryl monomer); an acryl monomer having two functional groups (or a bifunctional acryl monomer); an acryl monomer having one functional group (or a monofunctional acryl monomer); and a photo-initiator, and which has transmittance of 80% or higher at infrared wavelength (800 nm or higher), and maintains transmittance change within 1% even after heat treating at a high temperature of 200° C. or higher. Further, surface hardness of the ink composition according to the present invention is 5H, and adhesive force thereof is 5B. Therefore, the ink composition has excellent membrane properties.

The organic black pigment is a coloring agent, which determines infrared transmittance of a coating layer formed by curing an ink composition according to the present invention. It may be a perylene black pigment or a lactam black pigment, but other organic black pigments known in the art, for example, carbon black or aniline black can't be used because they block light at all wavelength (Details about this will be described in the following Examples). The amount of the organic black pigment in the whole ink composition may be 1 to 10 wt %, preferably 3 to 7 wt %, more preferably about 5 wt %. If the amount of the pigment is less than 1 wt %, transmittance at visible light may be increased, and if the amount thereof is more than 10 wt %, viscosity of the ink may be excessively increased, or performance of an infrared sensor may be deteriorated due to low visible light and infrared transmittance.

On the other hand, in addition to the organic black pigment, the pigment dispersion comprising the organic black pigment contains a dispersant and a reactive monomer. In this case, pigment particles having a uniform size can be obtained and also production time of the ink can be reduced, compared to using only the organic black pigment. Thus, any one of the organic black pigment and the pigment dispersion comprising the organic black pigment may be used, but it is more preferred to use the pigment dispersion.

In the case of using the pigment dispersion, the amount of the pigment dispersion may be 10 to 40 wt %, preferably 15 to 35 wt %, more preferably about 25 wt %, based on the total weight of the ink composition. If the amount of the pigment dispersion is less than 10 wt %, based on the total weight of the ink composition, visible light transmittance may increase, and if the amount thereof is more than 40 wt %, it may be difficult to be applied to an inkjet process due to too high viscosity of the ink and functionality of the infrared sensor may be deteriorated due to too low transmittance at visible light and infrared.

Further, in the case of using the pigment dispersion, the amount of the organic black pigment may be 3 to 40 parts by weight, preferably 10 to 30 parts by weight, more preferably about 20 parts by weight, based on 100 parts by weight of the pigment dispersion, the amount of the dispersant may be 2 to 6 parts by weight, preferably 3 to 5 parts by weight, more preferably about 4 parts by weight, based on 100 parts by weight of the pigment dispersion, and the amount of the reactive monomer may be 65 to 85 parts by weight, preferably 70 to 80 parts by weight, more preferably about 76 parts by weight, based on 100 parts by weight of the pigment dispersion.

The dispersant may be a polymeric, nonionic, anionic or cationic dispersant, for example, acryl-based, polyalkylene glycol and its esters, polyoxyalkylene polyalcohol, alkylene oxide ester adducts, alkylene oxide alcohol adducts, sulfonic acid ester, sulfonate, carboxylic acid ester, carboxylic, alkylamide alkylene oxide adducts, alkyl amine and the like, and it may be used alone or in a combination of two or more.

The reactive monomer may be any monomer which can be generally contained in an ultraviolet curable type ink composition, but it is preferred that the monomer having two or three functional groups, for example, 1,6-hexanediol diacrylate (HDDA), neopentylglycol diacrylate (NPGDA), hydroxypivalic acid neopentylglycol diacrylate (HPNDA), dipropyleneglycol diacrylate (DPGDA), tripropyleneglycol diacrylate (TPGDA), trimethylolpropane triacrylate (TMPTA), pentaerythritol triacrylate, trim ethylenepropane triacrylate, pentaerythtol triacrylate, trimethylenepropyl triacrylate, propoxylated glycerol triacrylate and the like are used alone or in a combination of two or more.

The acryl monomer having four or more functional groups (or multifunctional acryl monomer) is to make crosslink by ultraviolet (UV) curing thereby to increase membrane strength of a printed layer. It may be at least one common acryl monomer having four or more functional groups known in the art, for example, dipentaerythritol hexaacrylate (DPHA), dipentaerythritol pentaacrylate (DPPA), pentaerythritol tetraacrylate (PETA) and the like. On the other hand, examples of the functional groups mentioned herein may include an acrylate group, a carboxyl group and the like, but not limited thereto.

The amount of the acryl monomer having four or more functional groups in the whole ink composition may be 1 to 30 wt %, preferably 7 to 25 wt %, more preferably about 12 wt %. If the amount of the acryl monomer having four or more functional groups is less than 1 wt %, membrane strength may be insufficient, and if the amount thereof is more than 30 wt %, it may be impossible to perform processes due to too high viscosity of the ink.

The acryl monomer having three functional groups (or trifunctional acryl monomer) is to increase photo-polymerization rate, and it may be at least one common acryl monomer having three or more functional groups known in the art, for example, trimethylolpropane triacrylate (TMPTA), pentaerythritol triacrylate, trimethylenepropane triacrylate, pentaerythtol triacrylate, trimethylenepropyl triacrylate, propoxylated glycerol triacrylate and the like.

The amount of the acryl monomer having three functional groups in the whole ink composition may be 10 to 40 wt %, preferably 20 to 30 wt %, more preferably about 25 wt %. If the amount of the acryl monomer having three functional groups is less than 10 wt %, curing sensitivity may be bad, and if the amount thereof is more than 40 wt %, it may be impossible to perform processes due to too high viscosity of the ink.

The acryl monomer having two functional groups (or bifunctional acryl monomer) is to control viscosity of the ink and to increase its reactivity, and it may be at least one common acryl monomer having two functional groups known in the art, for example, 1,6-hexanediol diacrylate (HDDA), hydroxypivalic acid neopentylglycol diacrylate (HPNDA), dipropyleneglycol diacrylate (DPGDA), tripropyleneglycol diacrylate (TPGDA) and the like.

The amount of the acryl monomer having two functional groups in the whole ink composition may be 15 to 40 wt %, preferably 20 to 35 wt %, more preferably about 28 wt %. If the amount of the acryl monomer having two functional groups is less than 15 wt %, it may be difficult to control viscosity of the ink or reactivity may be deteriorated, and if the amount thereof is more than 40 wt %, likewise, it may be difficult to control viscosity of the ink and also reactivity may become too high.

The acryl monomer having one functional group (or monofunctional acryl monomer) is to control viscosity of the ink and to enhance adhesive force between a substrate and a printed layer. It may be at least one common acryl monomer having one functional group known in the art, for example, 2-hydroxyethyl acrylate (2-HEA), 4-hydroxybutyl acrylate (4-HBA), hydroxypropyl acrylate (HPA), 2-hydroxyethyl methacrylate (2-HEMA), hydroxypropyl methacrylate (HPMA) and the like. However, it may be more preferred to use alone the said 2-hydroxyethyl acrylate (2-HEA) having excellent adhesive force.

The amount of the acryl group having one functional group in the whole ink composition may be 5 to 30 wt %, preferably 10 to 20 wt %, more preferably about 15 wt %. If the amount of the acryl monomer having one functional group is less than 5 wt %, it may be difficult to control viscosity of the ink or adhesive force between the substrate and the printed layer may be insufficient, and if the amount thereof is more than 30 wt %, reactivity may be deteriorated because the amount of the acrylate monomer having two or more functional groups is reduced. On the other hand, the acryl monomer mentioned so far means methacrylate and acrylate, or all derivatives having substituted acrylate or methacrylate.

The photo-initiator is, in a curing process by ultraviolet, to start (initiate) a curing reaction for forming a polymer through a reaction of monomers, which have an unsaturated double bond contained in an ink. Examples of the photo-initiator may include 1-hydroxy-cyclohexyl-phenylketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphineoxide, bis(2,4,6-trimethylbenzoyl)-phenylphosphineoxide and the like, but not limited thereto. In addition, examples of commercially available products are Irgacure 184, Irgacure 500, Irgacure 651, Irgacure 369, Irgacure 907, Darocur 1173, DarocurMBF, Irgacure 819, Darocur TPO, Irgacure 907, Esacure KIP 100F, ITX and the like. The photo-initiator may be at least one of the mentioned compounds.

The amount of the photo-initiator in the whole ink composition may be 1 to 15 wt %, preferably 5 to 10 wt %, more preferably about 8 wt %. If the amount of the photo-initiator is less than 1 wt %, the curing reaction may be insufficient, and if the amount thereof is more than 15 wt %, the photo-initiator may not be completely dissolved.

On the other hand, if necessary, the ink composition according to the present invention may further comprises at least one of an adhesive force enhancer, a binder, a polymerization inhibitor and a surfactant. The adhesive force enhancer is to enhance adhesive force between the substrate and the printed layer, and it may maximize adhesive force when it is used together with the monofunctional acryl monomer. The adhesive force enhancer may be at least one selected from the group consisting of alkoxysilane compounds and phosphate-based acrylates such as phosphate acrylate. The alkoxysilane compound may be at least one of 3-glycidoxypropyl trimethoxysilane (KBM-403 (Shin-Etsu, USA)), 3-glycidoxypropyl methyldimethoxysilane (KBM-402), 2-(3,4 epoxycyclohexyl)ethyltrimethoxysilane (KBM-303), 3-glycidoxypropyl methyldiethoxysilane (KBE-402), 3-glycidoxypropyl triethoxysilane (KBE-403), 3-methacryloxypropyl trimethoxysilane (KBM-503) and the like.

In the case of using the adhesive force enhancer, the amount of the adhesive force enhancer may be 1 to 10 wt %, preferably 3 to 7 wt %, more preferably about 5 wt %, based on the total weight of the ink composition. If the amount of the adhesive force is less than 1 wt %, adhesive force may be deteriorated, and if the amount thereof is more than 10 wt %, effects which can be obtained by using the acryl monomers may be minor, for examples, reactivity may be deteriorated because the amount of the acryl monomer is relatively reduced.

The binder may be used to control adhesive force and surface hardness of a substrate and a printed layer. It may preferably be an epoxy-based acryl resin, but it may be any binder which can control adhesive force and surface hardness of the printed layer, without limitation. In the case of using the binder, the amount of the binder may be 1 to 5 wt %, preferably 1 to 3 wt %, more preferably about 1 wt %, based on the total weight of the ink composition. If the amount of the binder is less than 1 wt %, adhesive force and surface hardness of the printed layer may be insufficient, and if the amount thereof is more than 5 wt %, it may be difficult to perform an inkjet process due to too high viscosity of the ink.

The polymerization inhibitor is to prevent a curing reaction while storing the ink at a room temperature, and it may be at least one selected from monomethyl ether hydroquinone (MEHQ), benzoquinone, catechol, phenothiazine, N-nitrosophenylhydroxyamine, 2,2,6,6-tetramethylpiperidine-1-oxyl free radical and derivatives thereof. The amount of the polymerization inhibitor in the whole ink composition may be less than 1 wt %.

The surfactant is to make jetting smoothly and also make the ink properly spread on a glass substrate by controlling surface tension, and it may be used in an amount of less than 1 wt % in the whole ink composition. The surfactant may preferably be a fluoro-based surfactant, and specific examples of the fluoro-based surfactant may include F-410, F-430, F-444, F-477, F-553, F-554, F-555, F-556, F-557, F-558, F-559, F-560, F-561, F-562, F-563, F-565, F-568, F-569, F-570, F-571, F-572, R-40, R-41, R-43, R-94, RS-55, RS-56, RS-72-K, RS-75, RS-78, RS-90 and the like from DIC (DaiNippon Ink & Chemicals), but not limited thereto.

The ultraviolet curable and infrared permeable ink composition for an inkjet, having enhanced high temperature resistance, according to the present invention is curable at a light source of wavelength of 395 nm having 10,000 mJ/cm$^2$ or less (ultraviolet). There is no discoloration or deformation such as crack even if high temperature-heat treatment is performed after UV curing because the composition contains perylene black or lactam black pigments. Thus, when the ink composition according to the present invention is used (i.e., when the composition is printed to a thickness of about 5 μm for forming a coated film), there are advantages that transmittance at infrared wavelength (800 nm or higher) is maintained to 80% or higher (for example, transmittance at 850 nm is 82% and transmittance at 940 nm is 83%), and transmittance at visible light wavelength region (550 nm) is maintained to 15 to 25%.

On the other hand, the ink composition according to the present invention can form a pattern by an inkjet method, and inkjet jetting is possible because the composition has viscosity of 1 to 50 cP and surface tension of 18 to 40 N/m at a room temperature (25° C.). Likewise, in a manufacturing process of a touch window, time and cost required for the process can be reduced by forming coating layers of a bezel part and an infrared sensor part using the ink composition according to the present invention which is curable with ultraviolet.

On the other hand, the present invention provides an optical filter formed by using the above-mentioned ultraviolet curable and infrared permeable ink composition for an inkjet, having enhanced high temperature resistance. It is obvious that the optical filter has the same characteristics with the composition, i.e., transmittance of infrared wavelength (800 nm or higher) is maintained to 80% or higher, and transmittance at visible light wavelength region (550 nm) is maintained to 15 to 25%.

Figure 2:
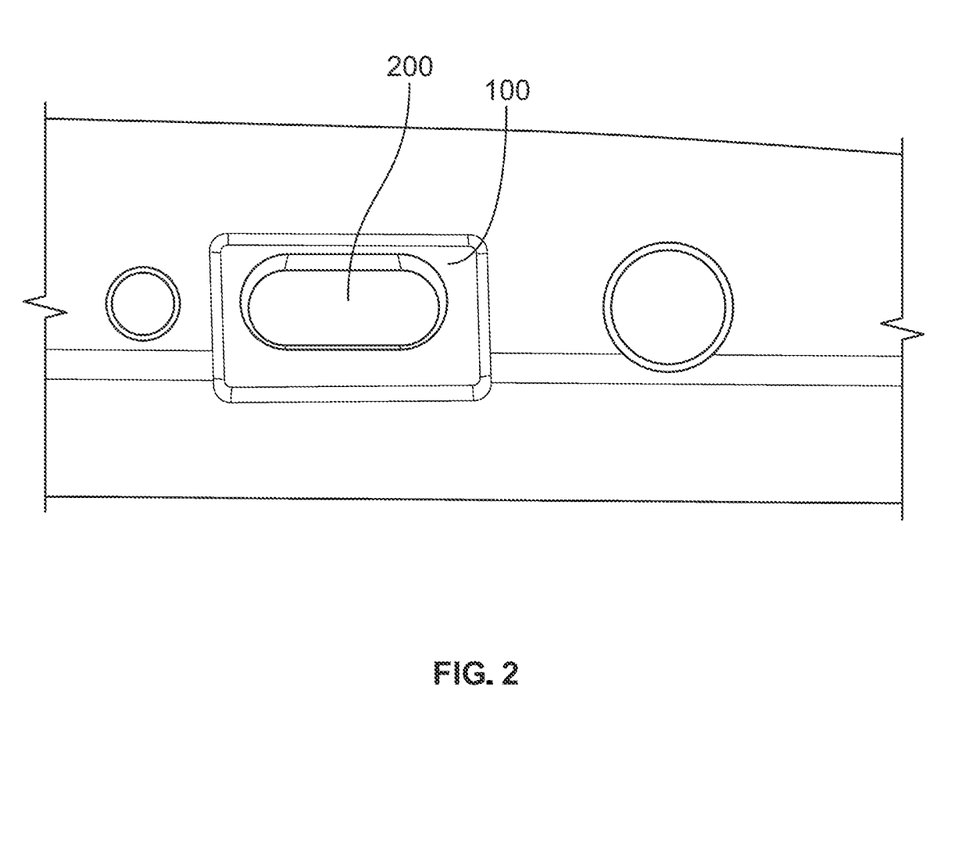
FIG. 2 is a picture of an infrared sensor coating layer formed by using an ink composition according to one embodiment of the present invention.

Further, briefly, a method for manufacturing an IR sensor coating layer such as an optical filter using the ultraviolet curable and infrared permeable ink composition for an inkjet, having enhanced high temperature resistance, according to the present invention, comprises the following steps of: inkjet printing with the ink composition and then pre-curing with ultraviolet (UV); and main curing with ultraviolet (UV) using an UV LED lamp of 395 nm wavelength and the like. FIG. 2 is a picture of an infrared sensor coating layer formed by using the ink composition according to one embodiment of the present invention. As illustrated in FIG. 2, using the ultraviolet curable and infrared permeable ink composition for an inkjet, having enhanced high temperature resistance, according to the present invention, the bezel layer 100 can be firstly printed (inkjet) and UV cured, and then immediately the IR layer 200 can be printed (inkjet) and UV cured. Therefore, it is possible to reduce processing time and cost for IR layer printing in a bezel printing process.

Hereinafter, the present invention will be explained in detail with reference to the following examples, including test examples. However, these examples are provided for illustrative purposes only and are not intended to limit the scope of the invention.

EXAMPLE 1

Preparation of Ultraviolet Curable and Infrared Permeable Ink Composition for an Inkjet, Having Enhanced High Temperature Resistance As the composition listed in the following Table 1, based on the total weight of the whole ink composition, 5 wt % of a perylene black pigment as a coloring agent, 1 wt % of a acryl-based dispersant, 12 wt % of DPHA as a multifunctional acryl monomer, 25 wt % of TMPTA as a trifunctional acryl monomer, 27.9 wt % of HPNDA as a bifunctional acryl monomer, 15 wt % of 2-HEA as a monofunctional acryl monomer, 3 wt % of Irgacure 819, 3 wt % of Irgacure 907 and 2 wt % of ITX as a photo-initiator, 1 wt % of an epoxy binder (PD-7610, Almatex), 5 wt % of KBM-403 as an adhesive force enhancer, a fluoro-based surfactant (RS-75) 0.05 wt %, and 0.05 wt % of MEHQ as a polymerization inhibitor were mixed. The mixture was stirred for 6 hours to prepare an ultraviolet curable and infrared permeable ink composition for an inkjet, having enhanced high temperature resistance. In the following Table 1, amount unit of all ingredients constituting the composition is wt %.

TABLE 1

| | | Example 1 | Example 2 |
|---|---|---|---|
| Coloring agent | X-55 (Dye) | | |
| | Perylene black | 5 | |
| | Lactam black | | 5 |
| | Carbon black | | |
| Dispersant | Acryl-based | 1 | 1 |
| Acryl monomer | DPHA (multifunctional) | 12 | 12 |
| | TMPTA (trifunctional) | 25 | 25 |
| | HPNDA (bifunctional) | 27.9 | 27.9 |
| | 2-HEA (monofunctional) | 15 | 15 |
| Binder | Epoxy binder | 1 | 1 |
| Adhesive force enhancer | KBM-403 | 5 | 5 |
| Photo-initiator | Irgacure 819 | 3 | 3 |
| | Irgacure 907 | 3 | 3 |
| | ITX | 2 | 2 |
| Surfactant | Fluoro-based | 0.05 | 0.05 |
| Polymerization inhibitor | MEHQ | 0.05 | 0.05 |

EXAMPLE 2

Preparation of Ultraviolet Curable and Infrared Permeable Ink Composition for an Inkjet, Having Enhanced High Temperature Resistance An ink composition was prepared with the same composition with Example 1 except for using 5 wt % of a lactam black pigment instead of 5 wt % of a perylene black pigment, as shown in the above Table 1.

COMPARATIVE EXAMPLE 1

Preparation of Ultraviolet Curable and Infrared Permeable Ink Composition for an Inkjet, Having Enhanced High Temperature Resistance An ink composition was prepared with the same composition with Example 1 except for using 5 wt % of a carbon black pigment instead of 5 wt % of a perylene black pigment, as shown in the following Table 2. At this time, in the following Table 2, amount unit of all ingredients constituting the composition is wt %.

TABLE 2

| | | Comp. Exam. 1 | Comp. Exam. 2 | Comp. Exam. 3 | Comp. Exam. 4 | Comp. Exam. 5 | Comp. Exam. 6 | Comp. Exam. 7 |
|---|---|---|---|---|---|---|---|---|
| Coloring Agent | X-55 (Dye) | | 5 | | | | | |
| | Perylene Black | | | | 5 | 5 | 5 | 5 | 5 |
| | Lactam Black | | | | | | | |
| | Carbon | 5 | | | | | | |

TABLE 2-continued

|  |  | Comp. Exam. 1 | Comp. Exam. 2 | Comp. Exam. 3 | Comp. Exam. 4 | Comp. Exam. 5 | Comp. Exam. 6 | Comp. Exam. 7 |
|---|---|---|---|---|---|---|---|---|
| Dispersant | Black Acryl-Based | 1 |  | 1 | 1 | 1 | 1 | 1 |
| Acryl Monomer | DPHA | 12 | 12 | 8 | 12 | 12 | 12 | 12 |
|  | TMPTA | 25 | 25 | 25 | 25 | 25 | 10 |  |
|  | HPNDA | 27.9 | 28.9 | 31.9 | 32.9 | 28.9 | 42.9 | 52.9 |
|  | 2-HEA | 15 | 15 | 15 | 15 | 15 | 15 | 15 |
| Binder | Epoxy | 1 | 1 | 1 | 1 |  | 1 | 1 |
| Adhesive Force Enhancer | KBM-403 | 5 | 5 | 5 |  | 5 | 5 | 5 |
| Photo-Initiator | Irgacure 819 | 3 | 3 | 3 | 3 | 3 | 3 | 3 |
|  | Irgacure 907 | 3 | 3 | 3 | 3 | 3 | 3 | 3 |
|  | ITX | 2 | 2 | 2 | 2 | 2 | 2 | 2 |
| Surfactant | Fluoro-based | 0.05 | 0.05 | 0.05 | 0.05 | 0.05 | 0.05 | 0.05 |
| Polymerization Inhibitor | MEHQ | 0.05 | 0.05 | 0.05 | 0.05 | 0.05 | 0.05 | 0.05 |

COMPARATIVE EXAMPLE 2

Preparation of Ultraviolet Curable and Infrared Permeable Ink Composition for an Inkjet, Having Enhanced High Temperature Resistance An ink composition was prepared with the same composition with Example 1 except for using 5 wt % of X-55 (BASF, Germany) as a dye instead of 5 wt % of a perylene black pigment and using 28.9 wt % of HPNDA as a bifunctional acryl monomer instead of 27.9 wt %, as shown in the above Table 2.

COMPARATIVE EXAMPLE 3

Preparation of Ultraviolet Curable and Infrared Permeable Ink Composition for an Inkjet, Having Enhanced High Temperature Resistance An ink composition was prepared with the same composition with Example 1 except for using 8 wt % of DPHA as a multifunctional acryl monomer instead of 12 wt % and using 31.9 wt % of HPNDA as a bifunctional acryl monomer instead of 27.9 wt %, as shown in the above Table 2.

COMPARATIVE EXAMPLE 4

Preparation of Ultraviolet Curable and Infrared Permeable Ink Composition for an Inkjet, Having Enhanced High Temperature Resistance An ink composition was prepared with the same composition with Example 1 except for using 32.9 wt % of HPNDA as a bifunctional acryl monomer instead of 27.9 wt % and not using KBM-403 as an adhesive force enhancer, as shown in the above Table 2.

COMPARATIVE EXAMPLE 5

Preparation of Ultraviolet Curable and Infrared Permeable Ink Composition for an Inkjet, Having Enhanced High Temperature Resistance An ink composition was prepared with the same composition with Example 1 except for using 28.9 wt % of HPNDA as a bifunctional acryl monomer instead of 27.9 wt % and not using a binder, as shown in the above Table 2.

COMPARATIVE EXAMPLE 6

Preparation of Ultraviolet Curable and Infrared Permeable Ink Composition for an Inkjet, Having Enhanced High Temperature Resistance An ink composition was prepared with the same composition with Example 1 except for using 10 wt % of TMPTA as a trifunctional acryl monomer instead of 25 wt % and using 42.9 wt % of HPNDA as a bifunctional acryl monomer instead of 27.9 wt %, as shown in the above Table 2.

COMPARATIVE EXAMPLE 7

Preparation of Ultraviolet Curable and Infrared Permeable Ink Composition for an Inkjet, Having Enhanced High Temperature Resistance An ink composition was prepared with the same composition with Example 1 except for not using TMPTA as a trifunctional acryl monomer and using 52.9 wt % of HPNDA as a bifunctional acryl monomer instead of 27.9 wt %, as shown in the above Table 2.

Evaluation of Physical Properties of Sample Prepared with Ink Composition in Examples 1 to 2 and Comparative Examples 1 to 7

The ink compositions prepared in Examples 1 and 2 and Comparative Examples 1 to 7 were inkjet printed on a square glass (size: width 50 mm, length 50 mm and thickness 0.5 µm) to a thickness of 4 or 5 µm, respectively, to prepare samples. Then, the samples were ultraviolet cured using an UV LED lamp (wavelength: 395 nm). The cured samples were heat treated at a high temperature of 220° C. for 1 hour, and then visible light transmittance, infrared transmittance, surface hardness and adhesive force were measured for the samples. The results are shown in the following Table 3. On the other hand, the infrared transmittance was measured at wavelength of 380 to 1,000 nm using an UV-VIS Spectrometer, the surface hardness was measured using a pencil hardness tester under conditions of Load 1 kg, Scratch angle 45 degree(°) and speed 3 mm/s (Standard: ASTM D3363), and the adhesive force was measured by a cross cut test and evaluated from 0B to 5B (Standard: ASTM D3002, D3359).

TABLE 3

|  | Exam. 1 | Exam. 2 | Comp. Exam. 1 | Comp. Exam. 2 | Comp. Exam. 3 | Comp. Exam. 4 | Comp. Exam. 5 | Comp. Exam. 6 | Comp. Exam. 7 |
|---|---|---|---|---|---|---|---|---|---|
| Transmittance Change (550 nm) after high temperature heat treatment (220° C., 1 h) | within 1% | within 1% | Block light of wavelength at infrared region | ≥50% (Discoloration) | within 1% | within 1% | within 1% | within 1% | within 1% |
| Surface Hardness | 5H | 5H | 5H | 4H | 3H | 5H | 4H | 4H | 4H |
| Adhesive Force | 5B | 5B | 5B | 5B | 5B | 0B | 3B | 5B | 5B |
| Curing Sensitivity | ○ | ○ | ○ | ○ | ○ | ○ | ○ | Δ | X |

In the both cases of Examples 1 and 2 using the perylene black pigment or the lactam black pigment, even if a high temperature-heat treatment is performed after UV curing, discoloration or deformation such as crack was not happened, transmittance change was within 1%, surface hardness was 5H, and adhesive force was 5B. Therefore, it can be found that high temperature heat resistance and membrane properties are excellent, and curing sensitivity is also excellent when printing in to a thickness of about 5 μm. Further, it can be found that the perylene black pigment used in Example 1 and the lactam black pigment used in Example 2 can be applied to an infrared (IR) ink due to high transmittance at an infrared region, but the carbon black pigment or the aniline black pigment blocks light at all wavelength of an infrared region. On the other hand, the ink compositions prepared in Examples 1 and 2 showed visible light (550 nm) transmittance of about 20% and infrared (800 nm or higher) transmittance of 80% or higher, and the infrared transmittance of the perylene black pigment was slightly higher than that of the lactam black pigment.

In Comparative Example 1 where only the perylene black pigment of Example 1 was changed to the carbon black pigment, it is impossible to apply the composition of Comparative Example 1 to an IR ink because it blocks light of wavelength at an infrared region. In Comparative Example 2 using a dye having excellent transmittance at an infrared region instead of the pigment, there was a problem that visible light transmittance was increased to 50% or higher due to the discoloration occurred by pyrolysis of the dye during the high temperature-heat treatment process. In Comparative Example 3, it can be found that the surface hardness was lowered to 3H by reducing the amount of the DPHA of Example 1 as a multifunctional acryl monomer from 12 wt % to 8 wt %. In Comparative Example 4 not using the adhesive force enhancer (or silane coupling agent, KBM-403) used in Example 1, the adhesive force was very low to 0B. In Comparative Example 5 not using the binder of Example 1, it can be found that the surface hardness (4H) and the adhesive force (3B) were lowered. In Comparative Examples 6 and 7 reducing the amount of the TMPTA used in Example 1 as a trifunctional monomer or not using the TMPTA, it can be found that the curing sensitivity is deteriorated as the amount of the TMPTA is reduced.

The invention claimed is:

1. An ultraviolet curable and infrared permeable ink composition for an inkjet, having enhanced high temperature resistance, which comprises:

an organic black pigment selected from the group consisting of perylene black or lactam black, or a pigment dispersion comprising the organic black pigment, wherein the amount of the organic black pigment in the whole ink composition is 1 to 10 wt %, or the amount of the pigment dispersion in the whole ink composition is 10 to 40 wt %;
an acryl monomer having four or more functional groups;
an acryl monomer having three functional groups;
an acryl monomer having two functional groups;
an acryl monomer having one functional group;
1 to 10 wt % of an adhesive force enhancer selected from the group consisting of 3-glycidoxypropyl trimethoxysilane, 3-glycidoxypropyl methyldimethoxysilane, 2-(3,4-epoxycyclohexyl)ethyltrimethoxysilane, 3-glycidoxypropyl triethoxysilane, and phosphate-based acrylates;
a polymerization inhibitor comprising at least one selected from among monomethyl ether hydroquinone (MEHQ), benzoquinone, catechol, phenothiazine, N-nitrosophenyl-hydroxylamine, and 2,2,6,6-tetramethylpiperidine-1-oxyl free radical; and
a photo-initiator,
and which has a transmittance of 80% or higher at an infrared wavelength of 800 nm or higher, and after heat treating at a temperature of 200° C. or higher maintains the transmittance within 1%,
wherein the amount of the acryl monomer having four or more functional groups in the whole ink composition is 1 to 30 wt %, the amount of the acryl monomer having three functional groups in the whole ink composition is 10 to 40 wt %, the amount of the acryl monomer having two functional groups in the whole ink composition is 15 to 40 wt %, and the amount of the acryl monomer having one functional group in the whole ink composition is 5 to 30 wt %.

2. The ultraviolet curable and infrared permeable ink composition for an inkjet, having enhanced high temperature resistance, according to claim 1, wherein the ink composition has surface hardness of 5H and adhesive force of 5B.

3. The ultraviolet curable and infrared permeable ink composition for an inkjet, having enhanced high temperature resistance, according to claim 1, wherein the ink composition has transmittance of 15 to 25% at a wavelength of 550 nm.

4. The ultraviolet curable and infrared permeable ink composition for an inkjet, having enhanced high temperature resistance, according to claim 1, wherein the amount of the photo-initiator in the whole ink composition is 1 to 15 wt %.

5. The ultraviolet curable and infrared permeable ink composition for an inkjet, having enhanced high temperature resistance, according to claim 1, wherein the acryl monomer having four or more functional groups is at least one monomer selected from the group consisting of dipentaerythritol hexaacrylate (DPHA), dipentaerythritol pentaacrylate (DPPA) and pentaerythritol tetraacrylate (PETA).

6. The ultraviolet curable and infrared permeable ink composition for an inkjet, having enhanced high temperature resistance, according to claim 1, wherein the acryl monomer having three functional groups is at least one monomer selected from the group consisting of trimethylolpropane triacrylate (TMPTA), pentaerythritol triacrylate, trimethylenepropane triacrylate, pentaerythritol triacrylate, trimethylenepropyl triacrylate and propoxylated glycerol triacrylate.

7. The ultraviolet curable and infrared permeable ink composition for an inkjet, having enhanced high temperature resistance, according to claim 1, wherein the acryl monomer having two functional groups is at least one monomer selected from the group consisting of 1,6-hexanediol diacrylate (HDDA), hydroxypivalic acid neopentylglycol diacrylate (HPNDA), dipropyleneglycol diacrylate (DPGDA) and tripropyleneglycol diacrylate (TPGDA).

8. The ultraviolet curable and infrared permeable ink composition for an inkjet, having enhanced high temperature resistance, according to claim 1, wherein the acryl monomer having one functional group is at least one monomer selected from the group consisting of 2-hydroxyethyl acrylate (2-HEA), 4-hydroxybutyl acrylate (4-HBA), hydroxypropyl acrylate (HPA), 2-hydroxyethyl methacrylate (2-HEMA) and hydroxypropyl methacrylate (HPMA).

9. The ultraviolet curable and infrared permeable ink composition for an inkjet, having enhanced high temperature resistance, according to claim 1, wherein the photoinitiator is one or a mixture of two or more selected from the group consisting of 1-hydroxy-cyclohexyl-phenylketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)-phenyl]-1-butanone, 2-methyl-1-[4-(methylthio)phenyl]-2-(4-morpholinyl)-1-propanone, diphenyl(2,4,6-trimethylbenzoyl)-phosphineoxide, bis(2,4,6-trimethylbenzoyl)-phenylphosphineoxide.

10. The ultraviolet curable and infrared permeable ink composition for an inkjet, having enhanced high temperature resistance, according to claim 1, wherein the pigment dispersion comprises 3 to 40 parts by weight of an organic black pigment based on 100 parts by weight of the pigment dispersion, 2 to 6 parts by weight of a dispersant based on 100 parts by weight of the pigment dispersion, and 65 to 85 parts by weight of a reactive monomer based on 100 parts by weight of the pigment dispersion.

11. The ultraviolet curable and infrared permeable ink composition for an inkjet, having enhanced high temperature resistance, according to claim 10, wherein the reactive monomer is one or a mixture of two or more selected from the group consisting of 1,6-hexanediol diacrylate (HDDA), neopentylglycol diacrylate (NPGDA), hydroxypivalic acid neopentylglycol diacrylate (HPNDA), dipropyleneglycol diacrylate (DPGDA), tripropyleneglycol diacrylate (TPGDA), trimethylolpropane triacrylate (TMPTA), pentaerythritol triacrylate, trimethylenepropane triacrylate, pentaerythritol triacrylate, trimethylenepropyl triacrylate and propoxylated glycerol triacrylate, having two or three functional groups.

12. The ultraviolet curable and infrared permeable ink composition for an inkjet, having enhanced high temperature resistance, according to claim 1, wherein the ink composition is curable under a light source having a wavelength of 395 nm and having an energy of 10,000 mJ/cm$^2$ or less.

13. The ultraviolet curable and infrared permeable ink composition for an inkjet, having enhanced high temperature resistance, according to claim 1, wherein the ink composition has a viscosity of 1 to 50 cP and a surface tension of 18 to 40 N/m at a temperature of 25° C. which allows jetting with the inkjet.

14. An optical filter formed by using the ultraviolet curable and infrared permeable ink composition for an inkjet according to claim 1, having enhanced high temperature resistance.

* * * * *